(No Model.)
S. T. WILLIAMS.
WHEEL.
No. 306,450. Patented Oct. 14, 1884.
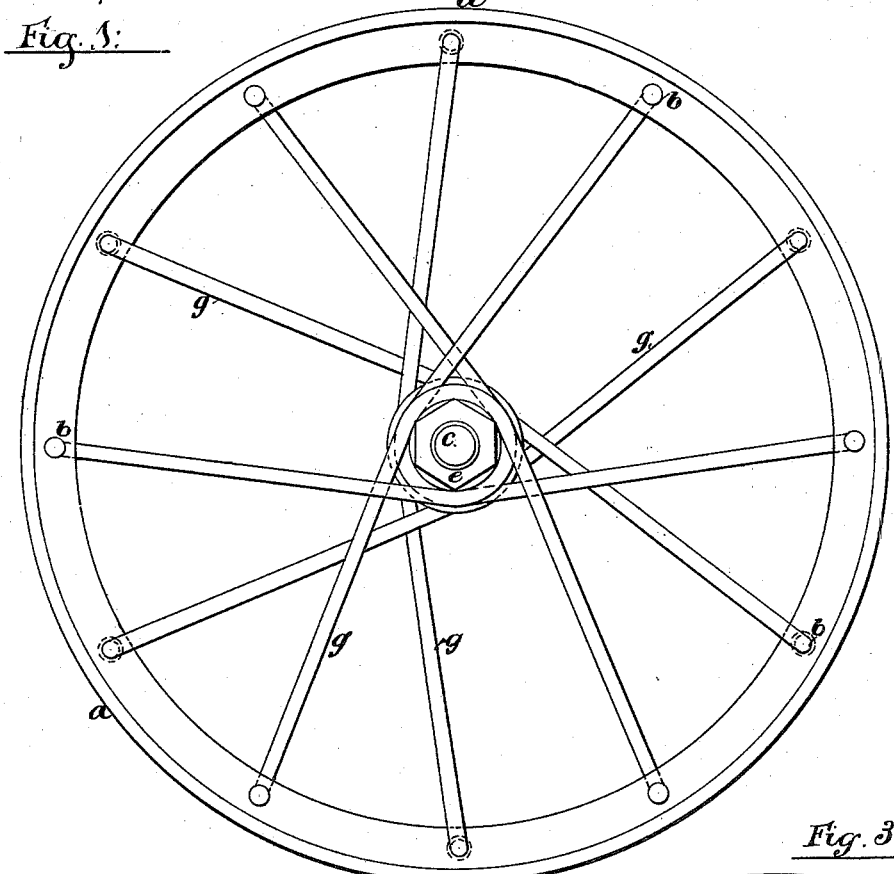
Fig. 1.
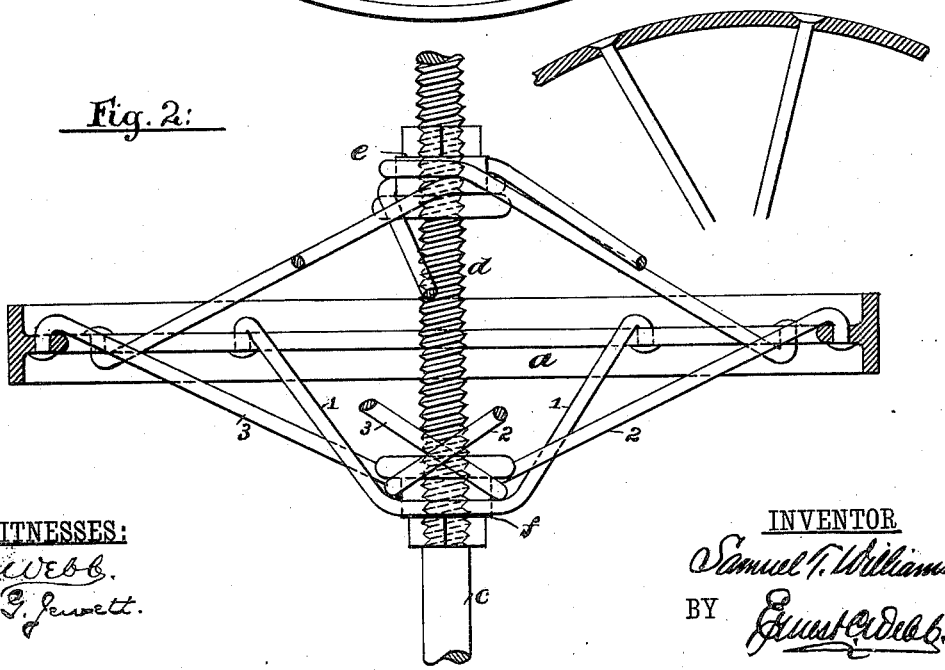
Fig. 2.
Fig. 3.
WITNESSES:
A. C. Webb.
Geo. F. Jewett.
INVENTOR
Samuel T. Williams
BY
Ernest C. Webb
ATTORNEY

UNITED STATES PATENT OFFICE.

SAMUEL T. WILLIAMS, OF RED BANK, ASSIGNOR TO THE WILLIAMS TENSION WHEEL COMPANY, OF NEWARK, NEW JERSEY.

WHEEL.

SPECIFICATION forming part of Letters Patent No. 306,450, dated October 14, 1884.

Application filed February 19, 1884. (No model.)

*To all whom it may concern:*

Be it known that I, SAMUEL T. WILLIAMS, a citizen of the United States, residing at Red Bank, in the county of Monmouth and State of New Jersey, have invented certain new and useful Improvements in Wheels, of which the following is a full, clear, and exact description.

This invention relates to that class of wheels in which the spokes are made of metal, of sufficient rigidity to support the requisite weight and yet elastic enough to be tensioned to greater rigidity or to become flexible and pliant.

The object of my invention is to produce a light strong wheel particularly adapted for wheelbarrows, although capable of use for other purposes, and of such construction that it can be cheaply made and easily repaired, when necessary, by any blacksmith or metal-worker.

To enable others skilled in the art to make and use my invention, I will now describe it by reference to the accompanying drawings, in which—

Figure 1 is a side elevation of a wheel embodying my invention. Fig. 2 is a sectional view thereof; and Fig. 3 is a section of part of the rim, showing a modification.

The letter $a$ designates the combined tire and felly, which are preferably made integral and of one piece of metal, having a T shape in cross-section. This constitutes the outer rim or periphery of the wheel. A series of holes, $b$, are drilled through the felly to receive the ends of the spokes. The felly is not an essential element of the wheel, as by making the tire of sufficient thickness and countersunk holes therein the ends of the spokes may be inserted through from the under side and then hammered down until they form rivet-heads, filling the countersunk portions of the holes and consequently too large to be drawn through the contracted portion when the spokes are tensioned. This is the modified construction shown in Fig. 3.

$c$ designates the axle, having a screw-threaded portion, $d$, to receive flanged bosses $e$ $f$, each having a central cylindrical portion or barrel-like body, the inner end of which is provided with a flange projecting at right angles thereto, and a nut-shaped outer end. These bosses are each preferably formed out of one piece of metal in any suitable manner.

$g$ designates the spokes, which consist of strips of wire or other tensile material of the requisite thickness, each strip of material forming two spokes.

The method of arranging and attaching the spokes is as follows, viz: In the wheel shown in the drawings there are twelve spokes, six on each side—that is to say, six spokes extending from each boss to the felly. For convenience of description, these spokes $g$ which extend from the boss $f$ to the tire and felly have been designated in Fig. 2 of the drawings by the numerals 1 2 3. Strips of material being cut of the requisite length, the strip to form the spokes 1 is bent in the center, and the loop thus formed slipped over the cylindrical portion of boss $f$ and drawn until it bears tightly against the flange. Its ends are then drawn under the felly, and are inserted through holes $b$, entering the holes from that side of the felly which is opposite the boss $f$. The ends projecting through the holes are then hammered down or riveted in place. The strips to form spokes 2 and 3 are then attached in the same way, each spoke extending from boss $f$, bearing against a neighboring spoke at a short distance from boss $f$. The spokes extending from boss $e$ are arranged and applied in precisely the same way.

To increase the tension on all the spokes simultaneously, the boss $e$ is screwed outwardly and away from the boss $f$, the latter remaining stationary, and to decrease the tension the boss $e$ or both bosses may be moved inwardly or toward each other.

It is obvious that a broken spoke may be replaced with a new one, and other repairs may be made with great facility and without detaching the wheel from the vehicle of which it may form a part.

What I claim as my invention, and desire to secure by Letters Patent, is—

1. The combination, in a wheel having two spokes formed of a single piece of wire or other tensile material looped over a flanged boss and having its two ends fastened in the manner described, of the tire or rim, and the flanged metal bosses $e f$, arranged on the axle or hub, as and for the purpose set forth.

2. The combination, in a wheel having the tire or rim $a$ and axle or hub $c$, of flanged metal bosses $e f$, having cylindrical portions and nut-shaped ends, and a spoke series in which two spokes are formed of a single piece of wire or other tensile material looped over the cylindrical portion of one of said bosses and having its two ends fastened in the manner described, the spokes extending from each boss, crossing and bearing against each other, as and for the purpose set forth.

3. In a wheel, substantially such as described, the spoke-adjusting devices $e f$, each consisting of a metal boss having a flange at its inner end, a cylindrical body, and nut-shaped outer end, cast or otherwise formed in one piece, as set forth.

In testimony whereof I have hereunto set my hand this 9th day of February, A. D. 1884.

SAMUEL T. WILLIAMS.

Witnesses:
ARTHUR C. WEBB,
ERNEST C. WEBB.